United States Patent
Huang (10) Patent No.: US 12,079,241 B2
(45) Date of Patent: Sep. 3, 2024

(54) METHOD AND DEVICE FOR SYNCHRONIZING DATA, AND STORAGE MEDIUM

(71) Applicant: Beijing Xiaomi Mobile Software Co., Ltd., Beijing (CN)

(72) Inventor: Jun Huang, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 114 days.

(21) Appl. No.: 17/874,157

(22) Filed: Jul. 26, 2022

(65) Prior Publication Data

US 2023/0297587 A1 Sep. 21, 2023

(30) Foreign Application Priority Data

Mar. 21, 2022 (CN) .......................... 202210280618.2

(51) Int. Cl.
*G06F 7/00* (2006.01)
*G06F 11/14* (2006.01)
*G06F 16/27* (2019.01)
*G06F 21/60* (2013.01)

(52) U.S. Cl.
CPC .......... *G06F 16/27* (2019.01); *G06F 11/1464* (2013.01); *G06F 21/602* (2013.01); *G06F 2201/84* (2013.01)

(58) Field of Classification Search
CPC .... G06F 16/27; G06F 11/1464; G06F 21/602; G06F 2201/84
USPC .......................................... 707/600–899, 624
See application file for complete search history.

(56) References Cited

U.S. PATENT DOCUMENTS

2004/0010510 A1* 1/2004 Hotti ..................... G06F 16/275

FOREIGN PATENT DOCUMENTS

| CN | 1855900 A | 11/2006 |
|---|---|---|
| CN | 102685787 A | 9/2012 |
| CN | 105450640 A | 3/2016 |
| CN | 106972958 A | 7/2017 |
| CN | 107360034 A | 11/2017 |
| CN | 112039692 A | 12/2020 |
| CN | 112152892 A | 12/2020 |

OTHER PUBLICATIONS

"2021 Smart Home Industry Development Research Report," https://new.gg.com/omn/20211019/20211019A01O9T00.html. 41 pages.

(Continued)

*Primary Examiner* — Isaac M Woo
(74) *Attorney, Agent, or Firm* — Oblon, McClelland, Maier & Neustadt, L.L.P.

(57) ABSTRACT

Aspects of the disclosure are directed to a method and device for synchronizing data, and a storage medium. The method can be applied to an intelligent home system, the intelligent home system including a primary gateway and a backup gateway. The method can include determining, in response to first stored data on the primary gateway being monitored to change, incremental data of changed first stored data relative to second stored data, the second stored data including currently stored data on the backup gateway, and sending the incremental data to the backup gateway for the backup gateway to synchronize the second stored data.

18 Claims, 6 Drawing Sheets

(56) References Cited

OTHER PUBLICATIONS

Zhi Neng Jia Ju, "Development Status And Prospect Analysis of China's Smart Home Industry, "Apr. 23, 2019, https://zhuanlan.zhihu.com/p/63365815. 17 pages.
Combined Chinese Office Action and Search Report issued Sep. 25, 2023 in Chinese Patent Application No. 202210280618.2 (with English Translation of Office Action only), 14 pages.
Extended European Search Report issued May 22, 2023 in European Patent Application No. 22187858.0, 7 pages.
Chinese Office Action dated Mar. 12, 2024, issued in Chinese Patent Application No. 202210280618.2 (with English translation).

* cited by examiner

METHOD AND DEVICE FOR SYNCHRONIZING DATA, AND STORAGE MEDIUM

CROSS REFERENCE TO RELATED APPLICATION

This application claims the benefit of priority to Chinese Patent Application No. 2022102806182, filed on Mar. 21, 2022, the contents of which are incorporated herein by reference in their entireties for all purposes.

BACKGROUND OF THE INVENTION

Field of the Invention

The present disclosure relates to the field of Internet technology, and in particular, to a method and device for synchronizing data, and a storage medium.

Description of the Related Art

With the development of Internet technology and the improvement of people's living standards, intelligent home systems are becoming increasingly popular. Existing intelligent home systems usually consist of intelligent gateways, sub-devices, with the corresponding: cloud services and mobile phone applications (APPs), etc., which can realize intelligent control of lighting, door locks, temperature and humidity monitoring, sensor alarm, camera and other functions.

Currently, intelligent home systems usually rely on cloud servers. For example, users controlling sub-devices through mobile phone APPs, as well as the reporting of sub-device's operation status and the triggering of intelligent scenes rely on the cloud server to achieve. Among them, the intelligent gateway, as the medium between the sub-device and the cloud server, will undertake the functions of parsing and sending the control commands of the cloud server, as well as obtaining and reporting the operation status of the sub-device. However, due to the large number of intelligent gateways, when a large number of intelligent gateways perform operations such as downloading and uploading data, it will cause huge pressure on the cloud server. Moreover, since each intelligent gateway involves downloading and uploading data from the cloud server, the efficiency of data synchronization among multiple intelligent gateways of the same user is low.

SUMMARY OF THE INVENTION

The present disclosure provides methods and devices for synchronizing data and storage mediums.

According to a first aspect of the embodiments of the present disclosure, there is provided a method for synchronizing data that is applied to an intelligent home system. The intelligent home system includes a primary gateway and a backup gateway. The method includes determining, by the primary gateway, in response to first stored data on the primary gateway being monitored to change, incremental data of changed first stored data relative to second stored data, the second stored data including currently stored data on the backup gateway; and sending the incremental data to the backup gateway for the backup gateway to synchronize the second stored data.

According to a second aspect of the embodiments of the present disclosure, there is provided a method for synchronizing data that is applied to an intelligent home system. The intelligent home system includes a primary gateway and a backup gateway. The method includes receiving, by the backup gateway, incremental data from the primary gateway, the incremental data including incremental data of changed first stored data relative to second stored data that is determined by the primary gateway in response to first stored data on the primary gateway being monitored to change, the second stored data including currently stored data on the backup gateway; and synchronizing, by the backup gateway, the second stored data based on the incremental data.

According to a third aspect of embodiments of the present disclosure, there is provided a primary gateway. The primary gateway includes a processor, and a memory storing a computer program. The processor is configured to execute the computer program to: determine, in response to first stored data on the primary gateway being monitored to change, incremental data of changed first stored data relative to second stored data, the second stored data including currently stored data on a backup gateway; and send the incremental data to the backup gateway for the backup gateway to synchronize the second stored data.

According to a fourth aspect of embodiments of the present disclosure, there is provided a backup gateway. The backup gateway includes a processor, and a memory storing a computer program. The processor is configured to execute the computer program to: receive incremental data from the primary gateway, the incremental data including incremental data of changed first stored data relative to second stored data that is determined by the primary gateway in response to first stored data on the primary gateway being monitored to change, the second stored data including currently stored data on the backup gateway; and synchronize the second stored data based on the incremental data.

According to a fifth aspect of embodiments of the present disclosure, there is provided a non-transitory computer-readable storage medium on which a computer program is stored. The program, when executed by a processor, implements: determining, in response to first stored data on a primary gateway being monitored to change, incremental data of changed first stored data relative to second stored data, the second stored data including currently stored data on a backup gateway; and sending the incremental data to the backup gateway for the backup gateway to synchronize the second stored data.

According to a sixth aspect of embodiments of the present disclosure, there is provided a non-transitory computer-readable storage medium on which a computer program is stored. The program, when executed by a processor, implements: receiving incremental data from a primary gateway, the incremental data including incremental data of changed first stored data relative to second stored data that is determined by the primary gateway in response to first stored data on the primary gateway being monitored to change, the second stored data including currently stored data on a backup gateway; and synchronizing the second stored data based on the incremental data.

It should be understood that the foregoing general description and the following detailed description are only exemplary and explanatory and do not limit the present disclosure.

BRIEF DESCRIPTION OF THE DRAWINGS

The accompanying drawings, which are incorporated in and constitute a part of this description, illustrate embodi

DETAILED DESCRIPTION OF THE PREFERRED EMBODIMENTS

Exemplary embodiments will be described here in detail, examples of which are illustrated in the accompanying drawings. When the following description relates to the drawings, the same numerals in different drawings refer to the same or similar elements unless otherwise indicated. The implementations described in the exemplary embodiments below are not intended to represent all implementations consistent with this disclosure. Rather, they are only examples of devices and methods consistent with some aspects of the present disclosure as recited in the appended claims.

Figure 1:
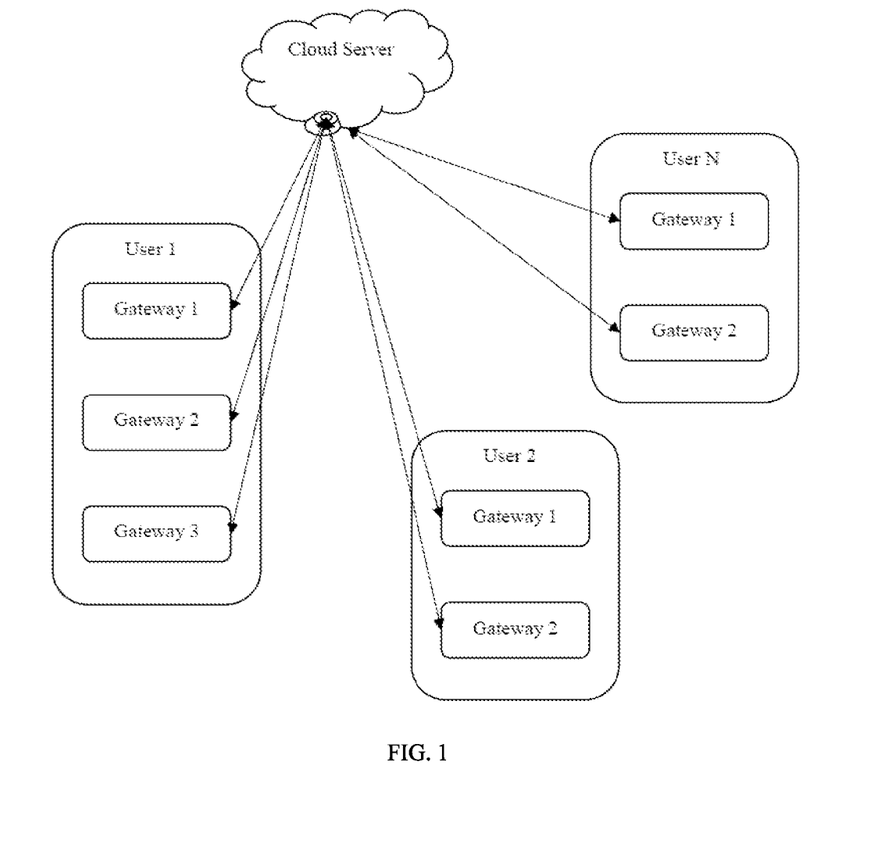
- FIG. 1 is a schematic diagram of data transmission architecture between a cloud server and gateways illustrated in accordance with some embodiments of the present disclosure.

FIG. 1 is a schematic diagram of data transmission architecture between a cloud server and gateways illustrated in accordance with some embodiments of the present disclosure. As shown in FIG. 1, there is a one-to-many relationship between the cloud server and the gateways, with the cloud server acting as the center and taking on a large amount of data upload and download pressure. Among the numerous gateways, there are many gateways belong to the same user. Taking Gateway 1, Gateway 2, and Gateway 3 of User 1 as an example, when Gateway 1 starts up, it can get the corresponding operation data from the cloud server to start working normally, after that, Gateway 2 and Gateway 3 start up, they also require to get the corresponding operation data from the cloud server to work normally. Thus, it can be seen that the data on the three Gateways 1, 2, and 3 are eventually the same, but the cloud server takes up the task of downloading the data three times, resulting in a huge pressure on the cloud server, and a lot of traffic will be consumed by the cloud server. Further, if a data update occurs during the operation of Gateway 1, Gateway 1 needs to upload the updated data to the cloud server according to a specific policy, while Gateway 2 and Gateway 3 need to download the updated data to the local area accordingly based on the corresponding policy, resulting in low efficiency of data synchronization among the gateways.

In implementing embodiments of the present disclosure, sharing data from different gateways under the same user name (e.g., the same intelligent home system), and for gateways of the same user, if they all download data from the cloud server or upload data directly to the cloud server, can result in wasted traffic. In view of this, the embodiments of the present disclosure provide the following methods, apparatuses, devices, and storage mediums for synchronizing data to address the aforementioned deficiencies in the related art.

Figure 2:
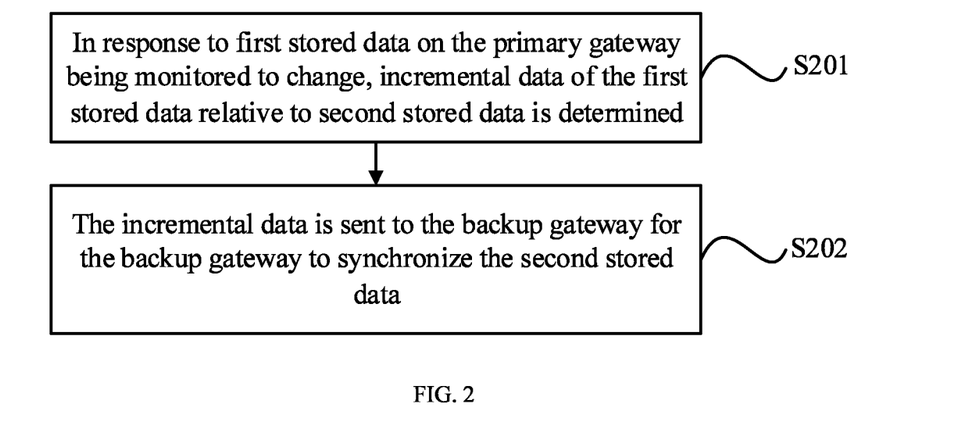
FIG. 2 is a flowchart of a method for synchronizing data illustrated in accordance with some embodiments of the present disclosure.

FIG. 2 is a flowchart of a method for synchronizing data illustrated in accordance with some embodiments of the present disclosure. The method can be applied to an intelligent home system. The intelligent home system includes the primary gateway and at least one backup gateway.

As shown in FIG. 2, the method includes the following steps S201 and S202.

In step S201, in response to first stored data on the primary gateway being monitored to change, the primary gateway determines incremental data of changed first stored data relative to second stored data.

In step S202, the primary gateway sends the incremental data to the backup gateway for the backup gateway to synchronize the second stored data. In this embodiment, the primary gateway may, in response to the first stored data on the primary gateway being monitored to change, determine the incremental data of the first stored data relative to the second stored data, where the second stored data includes currently stored data on the backup gateway, and in turn the primary gateway may send the incremental data to the backup gateway for the backup gateway to synchronize the second stored data.

The aforementioned primary gateway and the backup gateway may be gateways configured in the intelligent home system in advance based on a predetermined primary and backup gateway deployment method. It should be noted that the predetermined primary and backup gateway deployment method may be adopted from the related art based on actual needs, which is not limited in this embodiment.

It should be understood that the primary gateway may be used to connect the intelligent home system with the public network (outer net); and the backup gateway may be used to take over the work of the primary gateway in case of failure of the primary gateway, and/or, the backup gateway may act as a relay device between the primary gateway and other devices within the intelligent home system, for example, the backup gateway may forward control commands sent by the primary gateway to other devices within the intelligent home system, or may forward data uploaded by other devices to the primary gateway, etc. Therefore, the backup gateway needs to be synchronized with the primary gateway in terms of stored data.

For example, the primary gateway may monitor whether the first stored data on itself has changed, and may in turn determine the incremental data of the first stored data relative to the second stored data on the backup gateway when a change in the first stored data is detected. Here, the incremental data includes data of differences in the first stored data relative to the second stored data, such as data added, data deleted, or data whose value has changed.

The first stored data of the primary gateway may include at least one of user information, user device information, user scenario information, and user configuration data, which are not limited by this embodiment. For example, the primary gateway may monitor the change of its own first stored data in the event that the cloud server sends configuration data to the device of the intelligent home system, or the user modifies the configuration information of the device of the intelligent home system, etc. In some embodiments, the primary gateway may monitor whether the first stored data has changed using a real-time monitoring mechanism for file changes in related art, which is not limited by this embodiment.

Accordingly, the primary gateway may send the determined incremental data to the backup gateway to trigger the backup gateway to synchronize the currently stored data based on the incremental data, i.e., to modify the currently stored data on the backup gateway so that the modified stored data of the backup gateway is the same as the currently stored data (i.e., the changed first stored data) of the primary gateway.

It should be noted that the first stored data of the primary gateway does not include predetermined data that does not need to be synchronized, such as certain database cache files, etc., which is not limited by this embodiment. For example, a list of files to be excluded from monitoring may be pre-constructed, which may be used to record those data that do not need to be synchronized. Further, when the primary gateway monitors a change in its own first stored data, it may first exclude those data that do not need to be synchronized based on this file list, and then determine the incremental data relative to the second stored data of the backup gateway based on the data remaining after the exclusion.

It should be understood that the currently stored data of different backup gateways may be the same or different (e.g., if a backup gateway has dropped or lost power, etc., and then resumes operation, the currently stored data of the backup gateway may be different from the other backup gateways), and thus the primary gateway needs to determine the incremental data of the first stored data relative to the second stored data of each backup gateway separately and thus sends the incremental data to the corresponding backup gateway respectively, so that each backup gateway synchronizes data based on its own corresponding incremental data.

Figure 3:
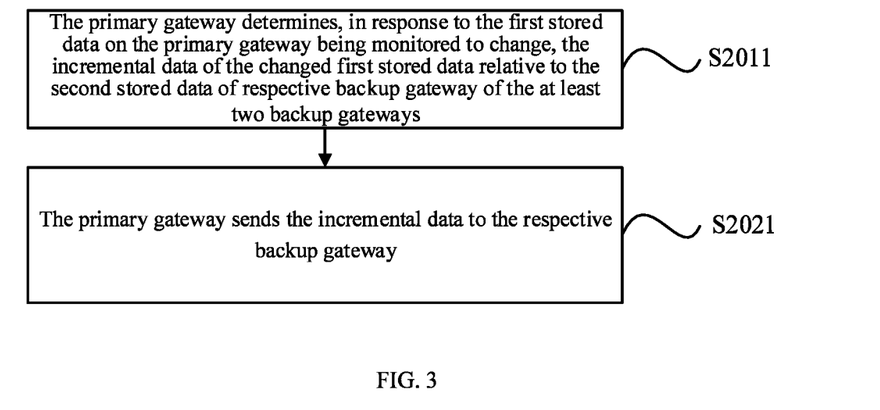
FIG. 3 is a flowchart of another method for synchronizing data illustrated in accordance with some embodiments of the present disclosure.

FIG. 3 is a flowchart of another method for synchronizing data illustrated in accordance with some embodiments of the present disclosure. In some embodiments, the intelligent home system includes the primary gateway and at least two backup gateways. As shown in FIG. 3, the method further includes the following steps S2011 and S2021.

In step S2011, the primary gateway determines, in response to the first stored data on the primary gateway being monitored to change, the incremental data of the changed first stored data relative to the second stored data of respective backup gateway of the at least two backup gateways.

In step S2021, the primary gateway sends the incremental data to the respective backup gateway.

In some embodiments, the method may further include: sending the incremental data to the backup gateway in response to a data synchronization condition being detected to be currently met.

The above-mentioned meeting the data synchronization condition includes at least one of the following (1) to (3).
(1) Reaching a predetermined synchronization period.
(2) A change in the first stored data on the primary gateway.
(3) Reaching a set length of time after the first stored data on the primary gateway has changed.

That is, the primary gateway may then send the incremental data to the backup gateway when it detects that the above data synchronization condition(s) is/are currently met. Each of the above data synchronization conditions is a synchronization policy that can be freely set based on actual requirements. Further, different software modules of the primary gateway (e.g., modules for receiving configuration information sent by the cloud server, modules for receiving configuration information from users for devices within the intelligent home system, etc.) may be set up with corresponding synchronization policies based on their own needs, i.e., the primary gateway may execute different synchronization policies for files of different software modules based on different synchronization policies.

As can be seen from the above description, in the method, the incremental data of the first stored data relative to the second stored data is determined in response to the first stored data on the primary gateway being monitored to change, where the second stored data includes the currently stored data on the backup gateway; and the incremental data is sent to the backup gateway for the backup gateway to synchronize the second stored data. Since the backup gateway synchronizes the currently stored data based on the incremental data sent by the primary gateway without the backup gateway interacting with the cloud server, the traffic consumption and the data processing pressure of the cloud server can be reduced. In addition, the backup gateway has a shorter link to obtain data from the primary gateway compared to the link of the backup gateway to obtain data from the cloud server, and thus, the efficiency and real-time performance of data synchronization of the backup gateway can be improved. Furthermore, in this embodiment, the dependence of the intelligent home system on the public network can also be reduced, and even if the public network fails, the primary gateway can still send incremental data to the backup gateway, which can improve the stability of the operation of the intelligent home system.

Figure 4:
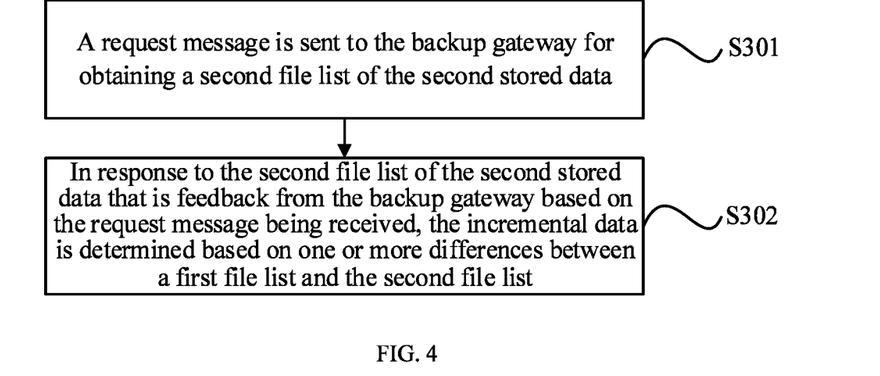
FIG. 4 is a flowchart illustrating how to determine incremental data of the first stored data relative to the second stored data in accordance with some embodiments of the present disclosure.

FIG. 4 is a flowchart illustrating how to determine incremental data of the first stored data relative to the second stored data in accordance with some embodiments of the present disclosure. The embodiments of this method are illustrated exemplarily on the basis of the above embodiments in terms of how to determine incremental data of the first stored data relative to the second stored data. As shown in FIG. 4, determining the incremental data of the first stored data relative to the second stored data as described in step S201 above may include the following steps S301 and S302.

In step S301, the primary gateway sends a request message to the backup gateway for obtaining a second file list of the second stored data.

In step S302, in response to the second file list of the second stored data that is feedback from the backup gateway based on the request message being received, the primary gateway determines the incremental data based on one or more differences between a first file list and the second file list.

In this method, when the primary gateway needs to determine the incremental data of the first stored data relative to the second stored data, it may send a request message to the respective backup gateway for obtaining a second file list of the second stored data, and in turn the respective backup gateway may, in response to receiving the request message, feedback a second file list of its own second stored data. Accordingly, the primary gateway may determine the incremental data based on one or more differences between the first file list of the first stored data and the second file list.

The file list may include a data identifier (e.g., a file name, etc.) of the corresponding stored data and/or summary information of the data. Thus, by comparing the first file list of the first stored data with the second file list, one or more differences between the first file list and the second file list can be determined, and then the incremental data of the first stored data of the primary gateway relative to the second stored data of the backup gateway can be determined based on the difference(s) between the file lists.

In this method, by determining the difference(s) between the first file list and the second file list, the incremental data, of the first stored data of the primary gateway, relative to the second stored data of the backup gateway, can be accurately determined, and subsequently each backup gateway can carry out data synchronization based on its own corresponding incremental data, thereby improving the efficiency and real-time performance of data synchronization of the backup gateway.

Figure 5:
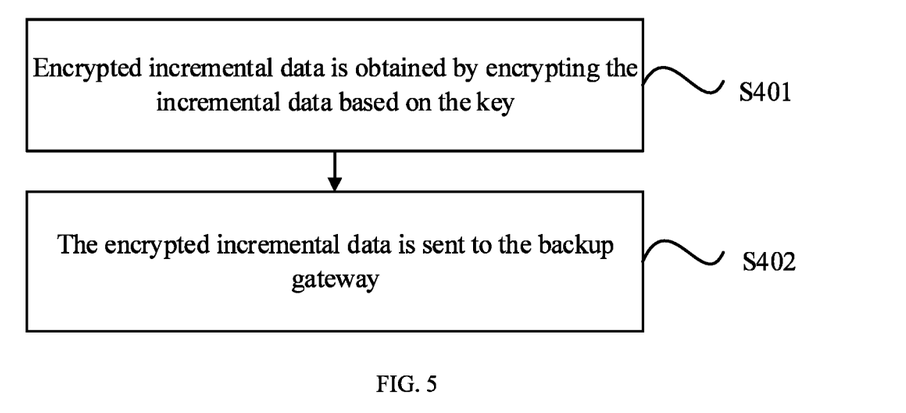
FIG. 5 is a flowchart illustrating how to send the incremental data to the backup gateway in accordance with some embodiments of the present disclosure.

FIG. 5 is a flowchart illustrating how to send the incremental data to the backup gateway in accordance with some embodiments of the present disclosure. The embodiments of this method are illustrated exemplarily on the basis of the above embodiments in terms of how to send the incremental data to the backup gateway. This method, based on the above embodiments, may further include: receiving a key for encrypting transmission data that is sent by the backup gateway based on an out-of-band (OOB) transport layer protocol.

Further, as shown in FIG. 5, the sending incremental data to the backup gateway as described in step S202 above may include the following steps S401 and S402.

In step S401, the primary gateway obtains encrypted incremental data by encrypting the incremental data based on the key.

In step S402, the primary gateway sends the encrypted incremental data to the backup gateway.

In this method, since the backup gateway is passively receiving data pushes from the primary gateway, the data transmission between the primary gateway and the backup gateway may be an encrypted transmission in order to ensure security. For example, the backup gateway may be responsible for generating a key for encrypting the transmission data and sending the generated key to the primary gateway based on the out-of-band (OOB) transport layer protocol to ensure the security of sending the key. In turn, when the primary gateway needs to send incremental data to the backup gateway, the incremental data may be encrypted by the key and then the encrypted incremental data may be sent to the backup gateway, which can ensure the security of the backup gateway.

In should be understood that, in order to further improve the security of the backup gateway, the keys for different backup gateways within the intelligent home system may be different.

Figure 6:
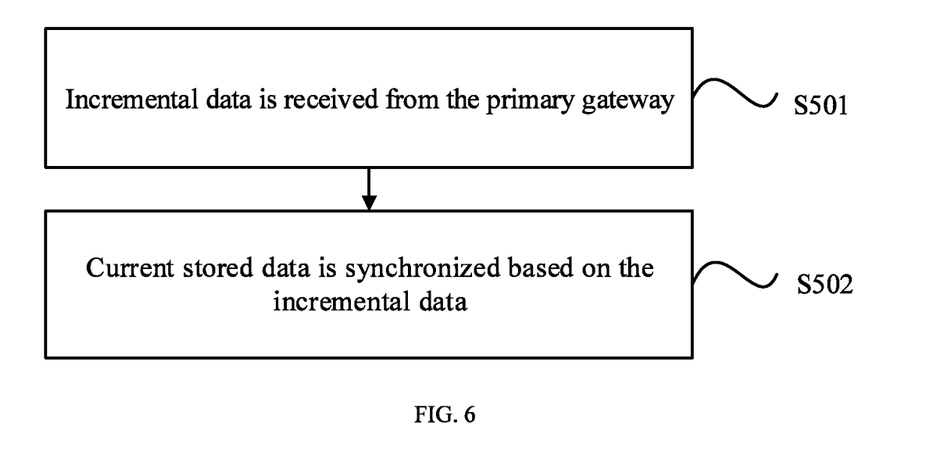
FIG. 6 is a flowchart of yet another method for synchronizing data illustrated in accordance with some embodiments of the present disclosure.

FIG. 6 is a flowchart of yet another method for synchronizing data illustrated in accordance with some embodiments of the present disclosure. The method is applied to an intelligent home system. The intelligent home system includes a primary gateway and at least one backup gateway. As shown in FIG. 5, the method may include the following steps S501 and S502.

In step S501, the backup gateway receives the incremental data from the primary gateway.

In step S502, the backup gateway synchronizes the second stored data based on the incremental data.

The incremental data includes incremental data of changed first stored data relative to second stored data that is determined by the primary gateway in response to the first stored data on the primary gateway being monitored to change. The second stored data includes currently stored data on the backup gateway.

In this method, the primary gateway may monitor whether its own first stored data has changed, and may in turn determine incremental data of the first stored data relative to the second stored data on the backup gateway when a change in the first stored data is detected, and may then send the determined incremental data to the backup gateway device. The backup gateway may receive the incremental data sent by the primary gateway accordingly, and synchronize the second stored data based on the incremental data.

In some embodiments, when the primary gateway needs to determine the incremental data of the first stored data relative to the second stored data, it may send a request message to the respective backup gateway for obtaining a second file list of the second stored data, and in turn the respective backup gateway may, in response to receiving the request message, feedback a second file list of its own second stored data. Accordingly, the primary gateway may determine the incremental data based on one or more differences between the first file list of the first stored data and the second file list.

In some embodiments, since the backup gateway is passively receiving data pushes from the primary gateway, the data transmission between the primary gateway and the backup gateway may be an encrypted transmission in order to ensure security. For example, the backup gateway may be responsible for generating a key for encrypting the transmission data and sending the generated key to the primary gateway based on the out-of-band (OOB) transport layer protocol to ensure the security of sending the key. In turn, when the primary gateway needs to send incremental data to the backup gateway, the incremental data may be encrypted by the key and then the encrypted incremental data may be sent to the backup gateway. Accordingly, the backup gateway may receive the encrypted incremental data sent by the primary gateway and parse the incremental data from the encrypted data based on the corresponding key, and may then synchronize the currently stored data based on that incremental data.

As can be seen from the above description, in the method, the incremental data is received from the primary gateway, the incremental data including incremental data of changed first stored data relative to second stored data that is determined by the primary gateway in response to the first stored data on the primary gateway being monitored to change, the second stored data including currently stored data on the backup gateway; and then the second stored data may be synchronized based on the incremental data. Since the backup gateway synchronizes the currently stored data based on the incremental data sent by the primary gateway without the backup gateway interacting with the cloud server, the traffic consumption and the data processing pressure of the cloud server can be reduced. In addition, the backup gateway has a shorter link to obtain data from the primary gateway compared to the link of the backup gateway to obtain data from the cloud server, and thus, the efficiency and real-time performance of data synchronization of the backup gateway can be improved.

Figure 7:
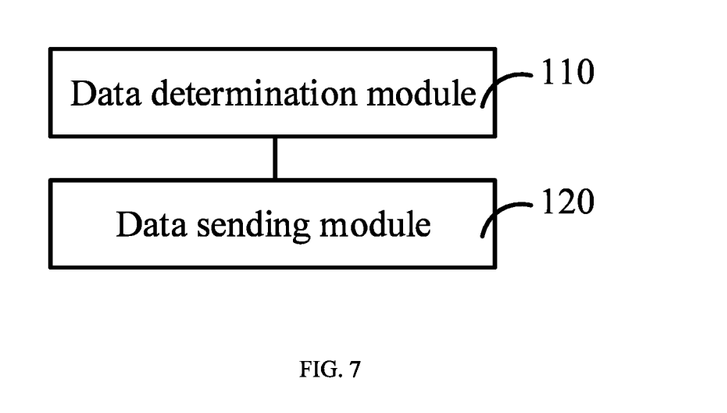
FIG. 7 is a block diagram of an apparatus for synchronizing data illustrated in accordance with an exemplary embodiment of the present disclosure.

FIG. 7 is a block diagram of an apparatus for synchronizing data illustrated in accordance with some embodiments of the present disclosure. The apparatus may be applied to a primary gateway of an intelligent home system. The intelligent home system includes the primary gateway and at least one backup gateway.

As shown in FIG. 7, the apparatus includes a data determination module 110 and a data sending module 120. The data determination module 110 is configured to determine, in response to first stored data on the primary gateway being monitored to change, incremental data of changed first stored data relative to second stored data, the second stored data including currently stored data on a backup gateway. The data synchronization module 120 is configured to send the incremental data to the backup gateway for the backup gateway to synchronize the second stored data.

As can be seen from the above description, the apparatus determines, in response to the first stored data on the primary gateway being monitored to change, the incremental data of the first stored data relative to the second stored data, the second stored data including currently stored data on the backup gateway; and sends the incremental data to the backup gateway for the backup gateway to synchronize the second stored data. Since the backup gateway synchronizes the currently stored data based on the incremental data sent by the primary gateway without the backup gateway interacting with the cloud server, the traffic consumption and the data processing pressure of the cloud server can be reduced. In addition, the backup gateway has a shorter link to obtain data from the primary gateway compared to the link of the backup gateway to obtain data from the cloud server, and thus, the efficiency and real-time performance of data synchronization of the backup gateway can be improved.

Figure 8:
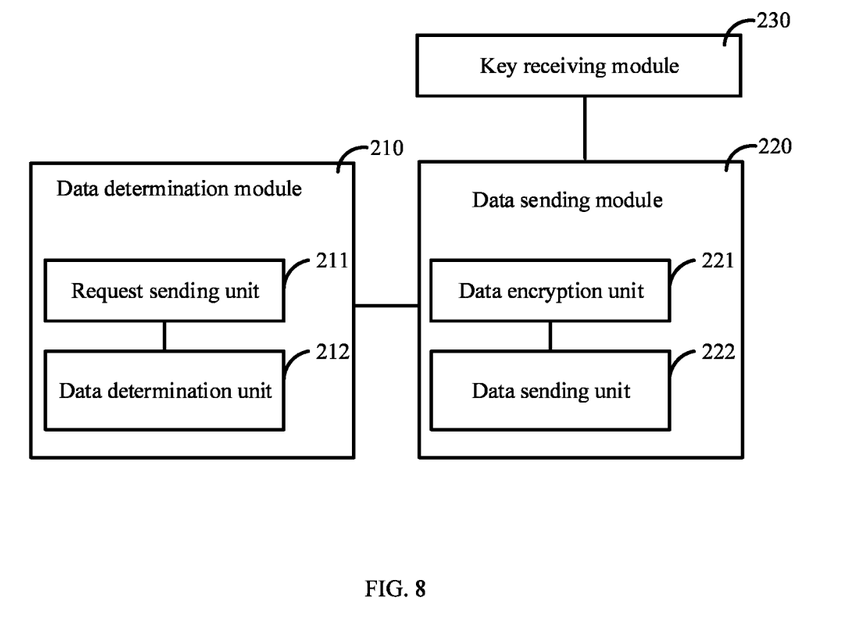
FIG. 8 is a block diagram of another apparatus for synchronizing data illustrated in accordance with some embodiments of the present disclosure.

FIG. 8 is a block diagram of another apparatus for synchronizing data illustrated in accordance with some embodiments of the present disclosure. The apparatus may be applied to a primary gateway of an intelligent home system. The intelligent home system includes the primary gateway and at least one backup gateway.

In this apparatus, the data determination module 210 and the data sending module 220 perform the same functions as the data determination module 110 and the data sending module 120 in the previous embodiment shown in FIG. 7 and will not be described herein.

As shown in FIG. 8, the data determination module 210 may include a request sending unit 211 configured to send a request message to the backup gateway for obtaining a second file list of the second stored data; and a data determination unit 212 configured to determine the incremental data based on one or more differences between a first file list and the second file list, the first file list being a file list of the first stored data.

In some embodiments, the apparatus may further include a key receiving module 230 configured to receive a key for encrypting transmission data that is sent by the backup gateway based on an out-of-band (OOB) transport layer protocol. The data sending module 220 may include a data encryption unit 221 configured to obtain encrypted incremental data by encrypting the incremental data based on the key; and a data sending unit 222 configured to send the encrypted incremental data to the backup gateway.

In some embodiments, the data sending module 220 is further configured to send the incremental data to the backup gateway in response to a data synchronization condition being detected to be currently met. Meeting the data synchronization condition includes at least one of: reaching a predetermined synchronization period; a change in the first stored data on the primary gateway; and reaching a set length of time after the first stored data on the primary gateway has changed.

Figure 9:
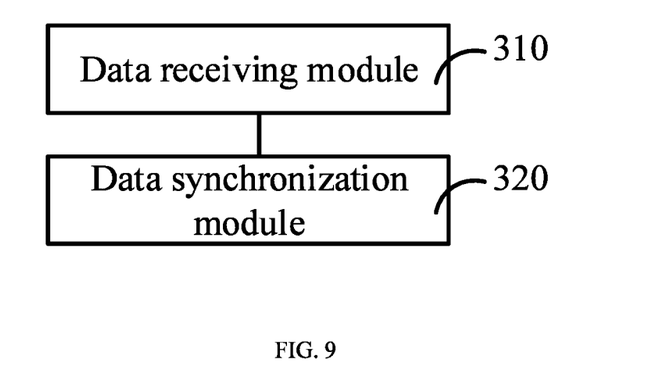
FIG. 9 is a block diagram of an apparatus for synchronizing data illustrated in accordance with some embodiments of the present disclosure.

FIG. 9 is a block diagram of an apparatus for synchronizing data illustrated in accordance with some embodiments of the present disclosure. The apparatus may be applied to a backup gateway of an intelligent home system. The intelligent home system includes a primary gateway and at least one backup gateway.

As shown in FIG. 8, the apparatus includes a data receiving module 310 and a data synchronization module 320. The data receiving module 310 is configured to receive incremental data from the primary gateway, the incremental data including incremental data of changed first stored data relative to second stored data that is determined by the primary gateway in response to first stored data on the primary gateway being monitored to change, the second stored data including currently stored data on the backup gateway. The data synchronization module 320 is configured to synchronize the second stored data based on the incremental data.

As can be seen from the above description, the apparatus receives the incremental data from the primary gateway, the incremental data including incremental data of the changed first stored data relative to second stored data that is determined by the primary gateway in response to the first stored data on the primary gateway being monitored to change, the second stored data including currently stored data on the backup gateway; and then may synchronize the second stored data based on the incremental data. Since the backup gateway synchronizes the currently stored data based on the incremental data sent by the primary gateway without the backup gateway interacting with the cloud server, the traffic consumption and the data processing pressure of the cloud server can be reduced. In addition, the backup gateway has a shorter link to obtain data from the primary gateway compared to the link of the backup gateway to obtain data from the cloud server, and thus, the efficiency and real-time performance of data synchronization of the backup gateway can be improved.

Figure 10:
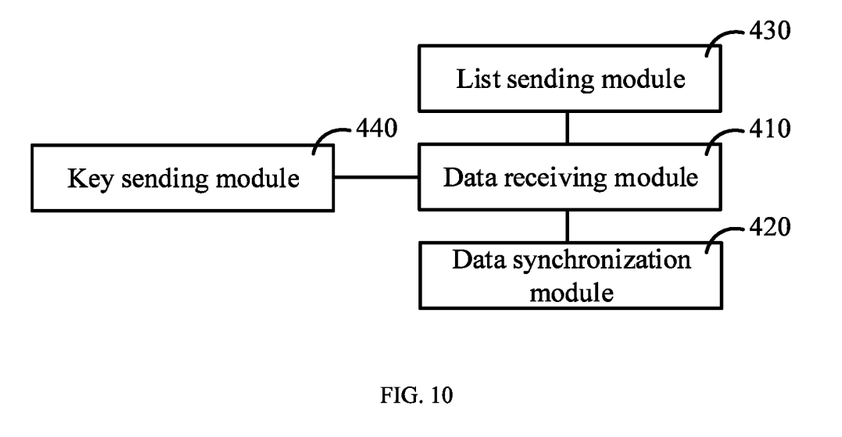
FIG. 10 is a block diagram of another apparatus for synchronizing data illustrated in accordance with some embodiments of the present disclosure.

FIG. 10 is a block diagram of another apparatus for synchronizing data illustrated in accordance with some embodiments of the present disclosure. The apparatus is applied to a backup gateway of an intelligent home system. The intelligent home system includes a primary gateway and at least one backup gateway. In this apparatus, the data receiving module 410 and the data synchronization module 420 have the same functions as the data receiving module 310 and the data synchronization module 320 in the previous embodiment shown in FIG. 9 and will not be described herein.

As shown in FIG. 10, the apparatus further includes a list sending module 430 configured to send, in response to a request message from the primary gateway for obtaining a second file list of the second stored data being received, the second file list of the second stored data to the primary gateway for the primary gateway to determine the incremental data based on one or more differences between a first file list and the second file list in response to the second file list of the second stored data that is feedback from the backup gateway based on the request message being received, where the first file list is a file list of the first stored data.

In some embodiments, the apparatus further includes a key sending module 440 configured to send a key for encrypting transmission data to the primary gateway based on an out-of-band (OOB) transport layer protocol. The data receiving module 410 is further configured to: receive encrypted incremental data from the primary gateway, wherein the encrypted incremental data comprises data obtained by the primary gateway encrypting the incremental data based on the key.

Figure 11:
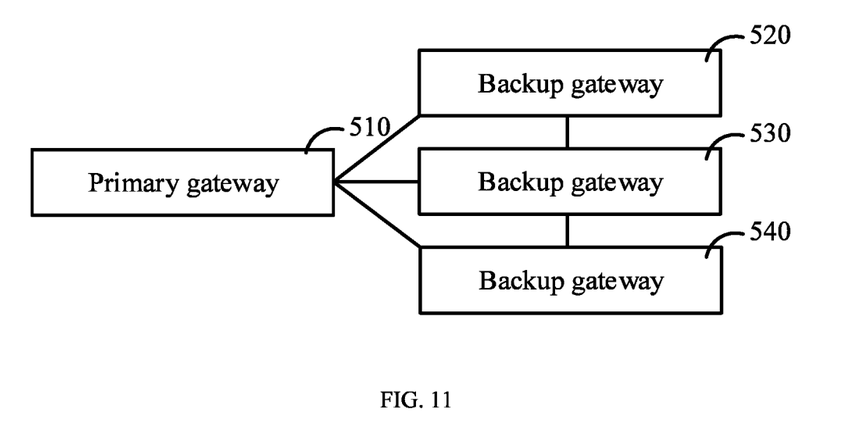
FIG. 11 is a block diagram of an intelligent home system illustrated in accordance with some embodiments of the present disclosure.

FIG. 11 is a block diagram of an intelligent home system illustrated in accordance with some embodiments of the present disclosure. As shown in FIG. 11, the system includes a primary gateway 510 and at least one backup gateway (e.g., backup gateway 520, backup gateway 530, and backup gateway 540, etc.).

The primary gateway 510 may be configured to determine, in response to first stored data on the primary gateway being monitored to change, incremental data of changed first stored data relative to second stored data, the second stored data including currently stored data on a backup gateway of the at least one backup gateway; and send the incremental data to the backup gateway for the backup gateway to synchronize the second stored data.

At least one of backup gateway 520, backup gateway 530, and backup gateway 540 may be configured to receive the incremental data from the primary gateway, and synchronize the second stored data based on the incremental data.

With respect to the apparatuses in the above-described embodiments, the specific manner in which the individual modules perform operations has been described in detail in the embodiments relating to the method, and will not be described in detail here.

Figure 12:
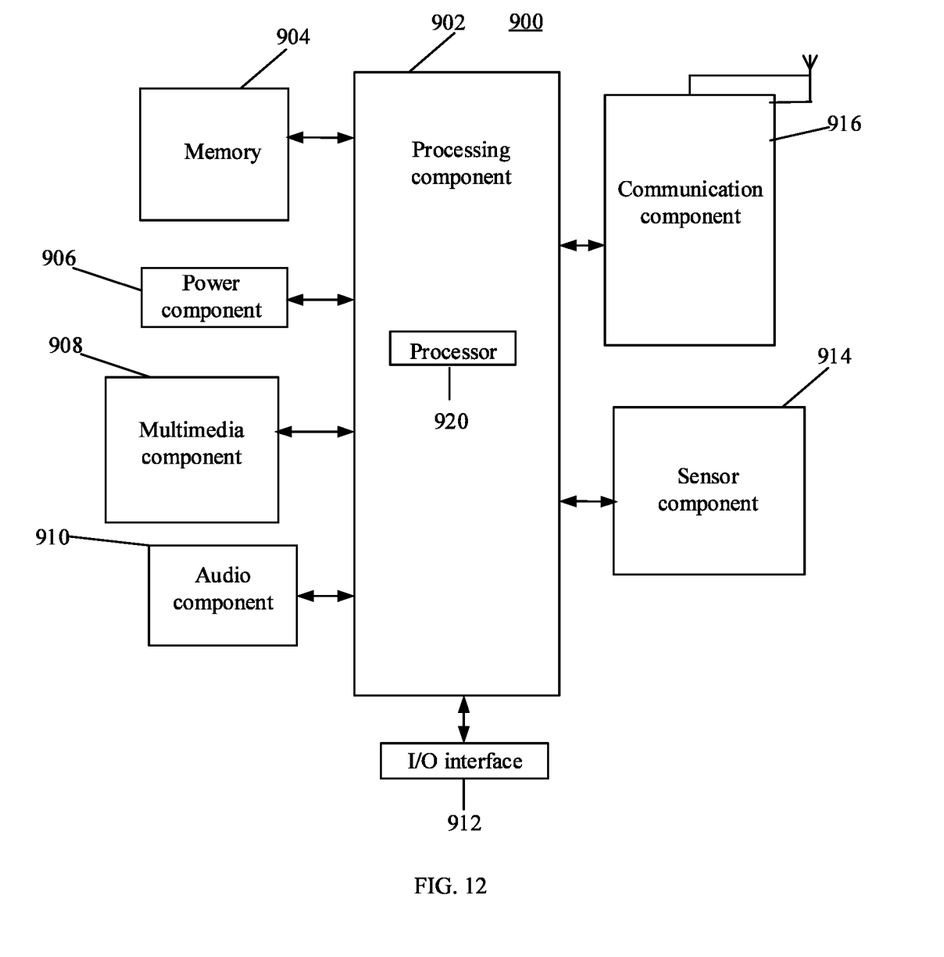
FIG. 12 is a block diagram of a gateway illustrated in accordance with some embodiments of the present disclosure.

FIG. 12 is a block diagram of a gateway illustrated in accordance with some embodiments of the present disclosure. For example, the device 900 may be a mobile phone, a computer, a digital broadcast terminal, a message sending and receiving device, a gaming console, a tablet device, a medical device, a fitness device, a personal digital assistant, and the like.

Referring to FIG. 12, the device 900 may include one or more of the following components: a processing component 902, a memory 904, a power component 906, a multimedia component 908, an audio component 910, an input/output (I/O) interface 912, a sensor component 914, and a communication component 916.

The processing component 902 typically controls the overall operation of the device 900, such as operations associated with display, phone call, data communication, camera operation, and recording operations. The processing component 902 may include one or more processors 920 to execute instructions to complete all or some of the steps of the method described above. In addition, the processing component 902 may include one or more modules that facilitate interaction between processing component 902 and other components. For example, processing component 902 may include a multimedia module to facilitate interaction between multimedia component 908 and processing component 902.

The memory 904 is configured to store various types of data to support operation at the electronic device 900. Examples of such data include instructions for any application or method of operation on the device 900, contact data, phonebook data, messages, images, videos, etc. The memory 904 can be implemented by any type of transitory or non-transitory storage device or a combination of them, such as static random-access memory (SRAM), electrically erasable programmable read-only memory (EEPROM), erasable programmable read-only memory (EPROM), programmable read-only memory (PROM), read-only memory (ROM), magnetic memory, flash memory, disk, or CD.

The power component 906 provides power to the various components of the device 900. The power component 906 may include a power management system, one or more power supplies, and other components associated with generating, managing, and distributing power for the device 900.

The multimedia component 908 includes a screen providing an output interface between the device 900 and the user. In some embodiments, the screen may include a liquid crystal display (LCD) and a touch panel (TP). If the screen includes a touch panel, the screen may be implemented as a touch screen to receive input signals from the user. The touch panel includes one or more touch sensors to sense touches, swipes, and gestures on the touch panel. The touch sensors may not only sense the boundaries of the touch or swipe action, but also detect the duration and pressure associated with the touch or swipe action. In some embodiments, the multimedia component 908 includes a front-facing camera and/or a rear-facing camera. The front camera and/or rear camera can receive external multimedia data when the device 900 is in an operating mode, such as shooting mode or video mode. Each front camera and rear camera may be a fixed optical lens system or have focal length and optical zoom capability.

The audio component 910 is configured to output and/or input audio signals. For example, the audio component 910 includes a microphone (MIC) configured to receive external audio signals when the device 900 is in an operating mode, such as call mode, recording mode, and voice recognition mode. The received audio signal may be further stored in memory 904 or sent via communication component 916. In some embodiments, the audio component 910 further includes a speaker for outputting audio signals.

The I/O interface 912 provides an interface between the processing component 902 and a peripheral interface module. The peripheral interface module may be a keyboard, click wheel, button, etc. These buttons may include, but are not limited to, a home button, a volume button, a start button, and a lock button.

The sensor component 914 includes one or more sensors for providing status assessment of various aspects of the device 900. For example, the sensor component 914 may detect an open/closed state of the device 900, the relative positioning of components, such as the components being the display and keypad of the device 900, the sensor component 914 may also detect a change in position of the device 900 or a component of the device 900, the presence or absence of user contact with the device 900, the orientation or acceleration/deceleration of the device 900 and temperature changes of the device 900. The sensor component 914 may include a proximity sensor configured to detect the presence of a nearby object in the absence of any physical contact. The sensor component 914 may also include a light sensor, such as a CMOS or CCD image sensor, for use in imaging applications. In some embodiments, the sensor component 214 may also include an accelerometer sensor, a gyroscope sensor, a magnetic sensor, a pressure sensor, or a temperature sensor.

The communication component 916 is configured to facilitate communication between the device 900 and other devices by wired or wireless means. The device 900 may access a wireless network based on any communication standard, such as WiFi, 2G, 3G, 4G, 5G, or a combination thereof. In one embodiment, communication component 216 receives broadcast signals or broadcast-related information from an external broadcast management system via a broadcast channel. In an embodiment, the communication component 916 further includes a near-field communication (NFC) module to facilitate short-range communication. For example, the NFC module may be implemented based on radio frequency identification (RFID) technology, infrared data association (IrDA) technology, ultra-wideband (UWB) technology, Bluetooth (BT) technology, and other technologies.

In some embodiments, the device 900 may be implemented by one or more application-specific integrated circuits (ASICs), digital signal processors (DSPs), digital signal processing devices (DSPDs), programmable logic devices (PLDs), field-programmable gate arrays (FPGAs), controllers, microcontrollers, microprocessors, or other electronic components for performing above mentioned method for measuring the distance.

In some embodiments, there is also provided a non-transitory computer readable storage medium including instructions, such as a memory 904 including instructions, the instructions being executable by the processor 920 of the device 900 to accomplish the method described above. For example, the non-transitory computer readable storage medium may be ROM, random access memory (RAM), CD-ROM, magnetic tape, floppy disk, and optical data storage devices, among others.

It should be further understood that, although the operations in the embodiments of the present disclosure are described in a specific order in the drawings, it should not be construed as requiring that the operations be performed in the specific order shown or the serial order, or as requiring that all of the operations shown be performed to obtain the desired result. Multitasking and parallel processing may be advantageous in certain circumstances.

Other embodiments of the present disclosure will readily occur to those skilled in the art upon consideration of the specification and practice of the invention disclosed herein. This application is intended to cover any variations, uses, or adaptations of the present disclosure that follow the general principles of the present disclosure and include common knowledge or techniques in the technical field not disclosed by the present disclosure. The specification and examples are to be regarded as exemplary only, and the true scope and spirit of the disclosure being indicated by the following claims.

It should be understood that the present disclosure is not limited to the precise structures described above and illustrated in the accompanying drawings, and that various modifications and changes may be made without departing from the scope thereof. The scope of the present disclosure is limited only by the scope of the appended claims.

The invention claimed is:

1. A method for synchronizing data, applied to an intelligent home system, the intelligent home system having a primary gateway and a backup gateway, the method comprising:
determining, by the primary gateway, in response to first stored data on the primary gateway being monitored to change, incremental data of changed first stored data relative to second stored data, the second stored data including currently stored data on the backup gateway; and
sending, by the primary gateway, the incremental data to the backup gateway for the backup gateway to synchronize the second stored data;
wherein the primary gateway is configured to connect the intelligent home system with a public network, and the backup gateway is configured to take over a work of the primary gateway in case of failure of the primary gateway, and/or, the backup gateway is configured to act as a relay device between the primary gateway and other devices within the intelligent home system.

2. The method of claim 1, wherein determining incremental data of changed first stored data relative to second stored data further comprises:
sending a request message to the backup gateway for obtaining a second file list of the second stored data; and
determining, in response to the second file list of the second stored data that is feedback from the backup gateway based on the request message being received, the incremental data based on one or more differences between a first file list and the second file list, the first file list being a file list of the first stored data.

3. The method of claim 1, further comprising:
receiving a key for encrypting transmission data that is sent by the backup gateway based on an out-of-band (OOB) transport layer protocol,
wherein sending the incremental data to the backup gateway comprises:
obtaining encrypted incremental data by encrypting the incremental data based on the key, and
sending the encrypted incremental data to the backup gateway.

4. The method of claim 1, further comprising:
sending the incremental data to the backup gateway in response to a data synchronization condition being detected to be currently met, wherein meeting the data synchronization condition comprises at least one of:
reaching a predetermined synchronization period,
a change in the first stored data on the primary gateway, and
reaching a set length of time after the first stored data on the primary gateway has changed.

5. The method of claim 1, wherein the intelligent home system includes the primary gateway and at least two backup gateways, the method further comprising:
determining, in response to the first stored data on the primary gateway being monitored to change, the incremental data of the changed first stored data relative to the second stored data of respective backup gateway of the at least two backup gateways; and
sending the incremental data to the respective backup gateway.

6. A non-transitory computer-readable storage medium having a computer program stored thereon, wherein the program, when executed by a processor, implements the method of claim 1.

7. A method for synchronizing data, applied to an intelligent home system, the intelligent home system having a primary gateway and a backup gateway, the method comprising:
receiving, by the backup gateway, incremental data from the primary gateway, the incremental data including incremental data of changed first stored data relative to second stored data that is determined by the primary gateway in response to first stored data on the primary gateway being monitored to change, the second stored data including currently stored data on the backup gateway; and synchronizing, by the backup gateway, the second stored data based on the incremental data;

wherein the primary gateway is configured to connect the intelligent home system with a public network, and the backup gateway is configured to take over a work of the primary gateway in case of failure of the primary gateway, and/or, the backup gateway is configured to act as a relay device between the primary gateway and other devices within the intelligent home system.

8. The method of claim 7, further comprising:
sending, in response to a request message from the primary gateway for obtaining a second file list of the second stored data being received, the second file list to the primary gateway for the primary gateway to determine the incremental data based on one or more differences between a first file list and the second file list, wherein the first file list is a file list of the first stored data.

9. The method of claim 7, further comprising:
sending a key for encrypting transmission data to the primary gateway based on an out-of-band (OOB) transport layer protocol,
wherein receiving incremental data from the primary gateway comprises:
receiving encrypted incremental data from the primary gateway that includes data obtained by the primary gateway encrypting the incremental data based on the key.

10. A backup gateway, comprising:
a processor and memory for storing a computer program;
wherein the processor is configured to execute the computer program to perform the method of claim 7.

11. The backup gateway of claim 10, wherein the processor is configured to execute the computer program to:
send, in response to a request message from the primary gateway for obtaining a second file list of the second stored data being received, the second file list to the primary gateway for the primary gateway to determine the incremental data based on one or more differences between a first file list and the second file list, wherein the first file list is a file list of the first stored data.

12. The backup gateway of claim 10, wherein the processor is configured to execute the computer program to:
send a key for encrypting transmission data to the primary gateway based on an out-of-band (OOB) transport layer protocol; and
receive incremental data from the primary gateway by receiving encrypted incremental data from the primary gateway that includes data obtained by the primary gateway encrypting the incremental data based on the key.

13. A non-transitory computer-readable storage medium having a computer program stored thereon, wherein the program, when executed by a processor, implements the method of claim 7.

14. A primary gateway, comprising:
a processor and memory for storing a computer program;
wherein the processor is configured to execute the computer program to:

determine, in response to first stored data on the primary gateway being monitored to change, incremental data of changed first stored data relative to second stored data, the second stored data including currently stored data on a backup gateway; and send the incremental data to the backup gateway for the backup gateway to synchronize the second stored data;

wherein the primary gateway is configured to connect the intelligent home system with a public network, and the backup gateway is configured to take over a work of the primary gateway in case of failure of the primary gateway, and/or, the backup gateway is configured to act as a relay device between the primary gateway and other devices within the intelligent home system.

15. The primary gateway of claim 14, wherein the processor is further configured to execute the computer program to:
send a request message to the backup gateway for obtaining a second file list of the second stored data; and
determine, in response to the second file list of the second stored data that is feedback from the backup gateway based on the request message being received, the incremental data based on one or more differences between a first file list and the second file list, the first file list being a file list of the first stored data.

16. The primary gateway of claim 14, wherein the processor is further configured to execute the computer program to:
receive a key for encrypting transmission data that is sent by the backup gateway based on an out-of-band (OOB) transport layer protocol; and
send the incremental data to the backup gateway by:
obtaining encrypted incremental data by encrypting the incremental data based on the key, and
sending the encrypted incremental data to the backup gateway.

17. The primary gateway of claim 14, wherein the processor is further configured to execute the computer program to:
send the incremental data to the backup gateway in response to a data synchronization condition being detected to be currently met, wherein meeting the data synchronization condition includes at least one of:
reaching a predetermined synchronization period,
a change in the first stored data on the primary gateway, and
reaching a set length of time after the first stored data on the primary gateway has changed.

18. The primary gateway of claim 14, wherein the intelligent home system includes the primary gateway and at least two backup gateways, and the processor is further configured to execute the computer program to:
determine, in response to the first stored data on the primary gateway being monitored to change, the incremental data of the changed first stored data relative to the second stored data of respective backup gateway of the at least two backup gateways; and
send the incremental data to the respective backup gateway.

* * * * *